United States Patent
Shu et al.

(10) Patent No.: US 10,447,758 B2
(45) Date of Patent: Oct. 15, 2019

(54) SYSTEM AND METHOD FOR SHARING WEB BROWSER STATE INFORMATION BETWEEN USER DEVICES

(71) Applicant: Samsung Electronics Co., Ltd., Gyeonggi-do (KR)

(72) Inventors: Chang Shu, Acton, MA (US); Laszlo Gombos, Winchester, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 14/968,624

(22) Filed: Dec. 14, 2015

(65) Prior Publication Data

US 2017/0171285 A1    Jun. 15, 2017

(51) Int. Cl.
| | | |
|---|---|---|
| *G06F 3/0484* | (2013.01) | |
| *G06F 3/0485* | (2013.01) | |
| *H04L 29/08* | (2006.01) | |
| *H04L 12/58* | (2006.01) | |

(52) U.S. Cl.
CPC ............ *H04L 67/02* (2013.01); *G06F 3/0485* (2013.01); *G06F 3/04842* (2013.01); *H04L 51/04* (2013.01); *H04L 51/32* (2013.01)

(58) Field of Classification Search
CPC ......... H04L 67/02; H04L 51/04; H04L 51/32; G06F 3/04842; G06F 3/0485; G06F 17/30873
See application file for complete search history.

(56) References Cited

U.S. PATENT DOCUMENTS

| 5,867,156 A | * | 2/1999 | Beard | G06F 3/0481 |
| | | | | 715/753 |
| 8,010,901 B1 | * | 8/2011 | Rogers | G06F 17/30873 |
| | | | | 709/204 |
| 9,792,266 B1 | * | 10/2017 | Armstrong | G06F 17/2247 |
| 2002/0083098 A1 | * | 6/2002 | Nakamura | G06F 17/30873 |
| | | | | 715/234 |
| 2002/0198941 A1 | * | 12/2002 | Gavrilescu | G06F 17/30873 |
| | | | | 709/205 |
| 2003/0061286 A1 | * | 3/2003 | Lin | G06F 17/30873 |
| | | | | 709/205 |
| 2004/0133848 A1 | | 7/2004 | Hunt et al. | |
| 2007/0203954 A1 | * | 8/2007 | Vargas | G06F 17/30584 |
| 2009/0012940 A1 | * | 1/2009 | Ives | G06F 17/30867 |

(Continued)

OTHER PUBLICATIONS

Foreign Communication from Related Counterpart Application; European Patent Application No. 16183539.2; European Search Report and European Search Opinion dated May 10, 2017, 8 pages.

*Primary Examiner* — Nicholas Klicos

(57) ABSTRACT

A user device comprising: i) a memory configured to store a browser application; and ii) a processor configured to execute the browser application, identify browser state information, and transfer the browser state information to a second user device. The browser state information comprises: a) a URL of a current webpage; and b) scroll position information associated with a current viewing rectangle in the current webpage, wherein the scroll position information comprises a scroll position of context text closest to a top-left corner of the current viewing rectangle. The scroll position information further comprises a scroll position of an image element closest to a top-left corner of the current viewing rectangle.

20 Claims, 7 Drawing Sheets

(56) References Cited

U.S. PATENT DOCUMENTS

| | | | |
|---|---|---|---|
| 2010/0177696 A1* | 7/2010 | Jung | H04L 67/24 370/328 |
| 2011/0022945 A1 | 1/2011 | Yang | |
| 2014/0164352 A1* | 6/2014 | Denninghoff | H03H 9/02622 707/711 |
| 2015/0039694 A1* | 2/2015 | Yoon | H04L 12/1813 709/204 |
| 2015/0046832 A1 | 2/2015 | George et al. | |
| 2016/0036766 A1* | 2/2016 | Himmelsbach | H04L 67/025 709/203 |

* cited by examiner

SYSTEM AND METHOD FOR SHARING WEB BROWSER STATE INFORMATION BETWEEN USER DEVICES

TECHNICAL FIELD

The present application relates generally to browser-capable information devices and, more specifically, to a method of transferring enhanced browser state information between browser-capable user devices.

BACKGROUND

Many information devices (e.g., computers, smartphones, smart TVs, tablet computers) provide a capability to enable a first information device to communicate with another information device and move a task from one device to another. For example, a user can start browsing a web page on a smartphone and pick up the same link on a tablet or a laptop computer. However, conventional systems that transfer web browser state information are essentially limited to transmitting a URL of the current browsing webpage. Although a user may be able to continue browsing the same website, key information of the browser state are missing. By way of example, scroll position is lost. The user must start from the beginning of the webpage and scroll to the same location on the webpage at which he or she paused when initiating the transfer to another device. Also, session information is lost. For example, user may be forced to re-enter a username and a password if the webpage is a secure one. Alternatively, the user may be forced to restart a shopping process from the beginning. Also, form data is not preserved, so the user must re-enter all input data if the user stopped in the middle of the filling-in the form on the first device.

This problem is further complicated by the fact that information devices use many different screen sizes. Even if a second device loads the same webpage as a first device, the layout of the webpage content on the second device may be significantly different from the first (original) device. Scrolling to the same relative position of the viewport rectangle does not guarantee the same content shows in the view. Another problem is the content of the webpage itself. If the two devices differ significantly, the same URL may retrieve different web content (e.g., mobile vs. desktop version) of the same web site.

Therefore, there is a need in the art for an improved apparatus and method for transfer web browser information from a first information device to a second information device. In particular, there is a need for an apparatus and method for transferring scroll position and form content between browser-capable processing systems.

SUMMARY

To address the above-discussed deficiencies of the prior art, it is a primary object to provide a user device comprising: i) a memory configured to store a browser application; and ii) a processor configured to execute the browser application, identify browser state information, and transfer the browser state information to a second user device. The browser state information comprises: a) a URL of a current webpage; and b) scroll position information associated with a current viewing rectangle in the current webpage, wherein the scroll position information comprises a scroll position of context text closest to a top-left corner of the current viewing rectangle.

In an advantageous embodiment, the scroll position information comprises a scroll position of an image element closest to a top-left corner of the current viewing rectangle.

It is another primary object to provide a method for use in a user device comprising a memory configured to store a browser application and a processor configured to execute the browser application. The method comprises: i) identifying browser state information; and ii) transferring the browser state information to a second user device. The browser state information comprises: a) a URL of a current webpage; and b) scroll position information associated with a current viewing rectangle in the current webpage, wherein the scroll position information comprises a scroll position of context text closest to a top-left corner of the current viewing rectangle.

It is another primary object to provide a non-transitory computer readable medium configured to control a processor to perform a method of transferring browser state information from a sending user device to a receiving user device. The method comprises: i) identifying browser state information in the sending user device; and ii) transferring the browser state information from the sending user device to the receiving user device. The browser state information comprises a) a URL of a current webpage; and b) scroll position information associated with a current viewing rectangle in the current webpage, wherein the scroll position information comprises a scroll position of context text closest to a top-left corner of the current viewing rectangle.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged browser-capable user device.

This present disclosure provides an improved web browser application that restores the browser to its full previous state after the browser state information is transferred from a first user device to a second user device. The enhanced browser state information includes: i) the URL of the browsing website; ii) scroll position of the webpage using a heuristic approach; iii) session information of the webpage using cookies; iv) form data for the webpage; and v) web state and session transfer between vastly different devices/form factors (PC, mobile, tablet, TV, head mounted device, wearable).

Figure 1:
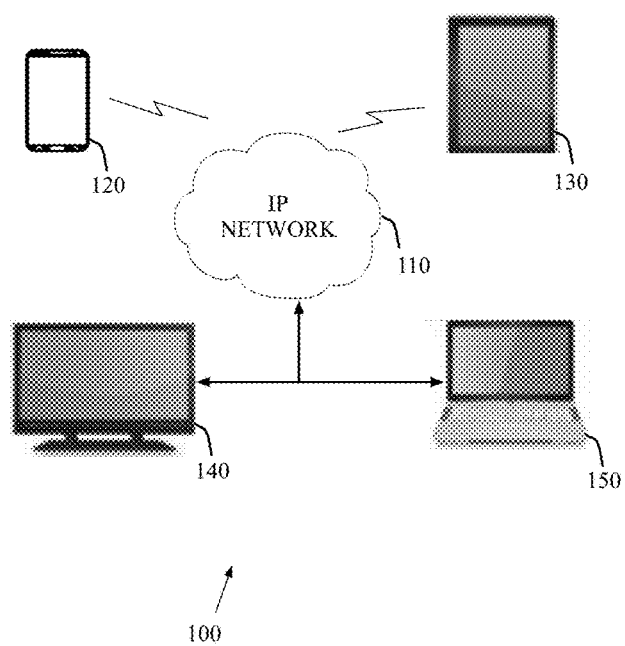
FIG. 1 illustrates a communication network in which browser-capable user devices exchange browser state information according to an embodiment of the disclosure.

FIG. 1 illustrates communication network 100 in which browser-capable user devices 120, 130, 140, and 150 exchange browser state information according to an embodiment of the disclosure. In the exemplary embodiment, user device 120 is assumed to be mobile phone 120, user device 130 is assumed to be tablet 130, user device 140 is assumed to be smart television (TV) 140, and user device 150 is assumed to be laptop personal computer (PC) 150. According to the principles of the present disclosure, user devices 120, 130, 140, and 150 exchange the enhanced browser state information via Internet protocol (IP) network 110, such as Internet 110, or home network 110. It is noted that mobile phone 120, tablet 130, smart TV 140, and laptop PC 150 have different screen sizes and resolutions, and are operated by different input devices.

Figure 2:
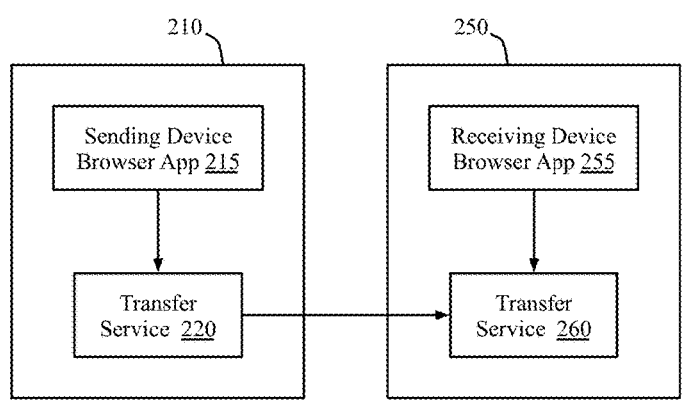
FIG. 2 illustrates two browser-capable user devices exchanging browser state information according to an embodiment of the disclosure.

FIG. 2 illustrates two browser-capable user devices 210 and 250 exchanging enhanced browser state information according to an embodiment of the disclosure. Each of user devices 210 and 250 may be any one of mobile phone 120, tablet 130, smart TV 140, and laptop PC 150. It is assumed in FIG. 2 that user device 210 is the first (i.e., original, sending, transmitting) user device 210. When a user initiates a transfer action from first (or sending) device browser application 215, sending device browser application 215 starts to collect all the enhanced state information described above.

Sending device browser application 215 then composes the enhanced state information into a text message and sends the text message over to the second (receiving) user device 250 through a communication link, such as the Transfer service on Samsung smartphones and tablets. In FIG. 2, Transfer service 220 in sending user device 210 establishes a communication link with Transfer service 260 in receiving user device 250. The communication link transmits the text message containing the enhanced state information and prompts the user on receiving user device 250. Second (or receiving) device browser application 255 is launched on receiving user device 250, which prepares to restore the webpage state received from Transfer service 260. First, receiving device browser application 255 restores the cookies for the website. Next, receiving device browser application 255 loads the URL. After the webpage is fully loaded, receiving device browser application 255 restores the other browser states, including scroll position, form data, and zoom level.

The present disclosure describes below how the scroll position information is collected from sending device browser application 215 on sending user device 210 and how the scroll position information is restored in receiving device browser application 255 in receiving user device 250. The scroll position restoration process provided by the present disclosure comprises a heuristic approach. The sending device browser application 215 first identifies a context text string in the original webpage that can specify the scroll offset of the current page and then searches for the same text in the receiving device browser application 255 and scrolls the page to reveal the context text.

This text-based scroll position restoration works even if: i) the layout of the web page on the receiving device is different from the sending (or transmitting) device; ii) the content of the web page on the receiving device is not identical to the transmitting device (i.e., different content for different browsers, dynamic news content, different web banners, etc.). The transfer of enhanced browser state information works best in local area networks (e.g., home networks), because the public-facing IP address does not change between saving and restoring the client session. Thus, the originating webpage server does not detect the transfer.

Collecting Scroll Position Information

Figure 4A:
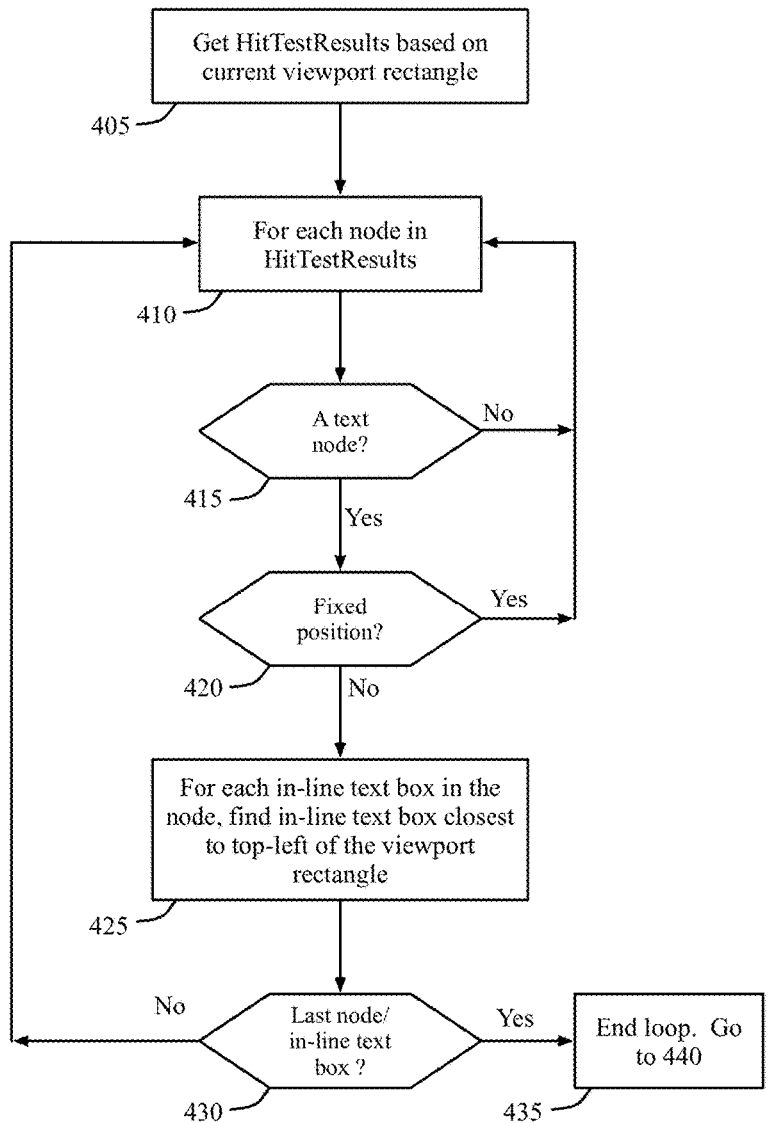
FIGS. 4A and 4B are a flow diagram illustrating gathering and transmitting of browser state information in a user device according to an embodiment of the disclosure.
Figure 4B:
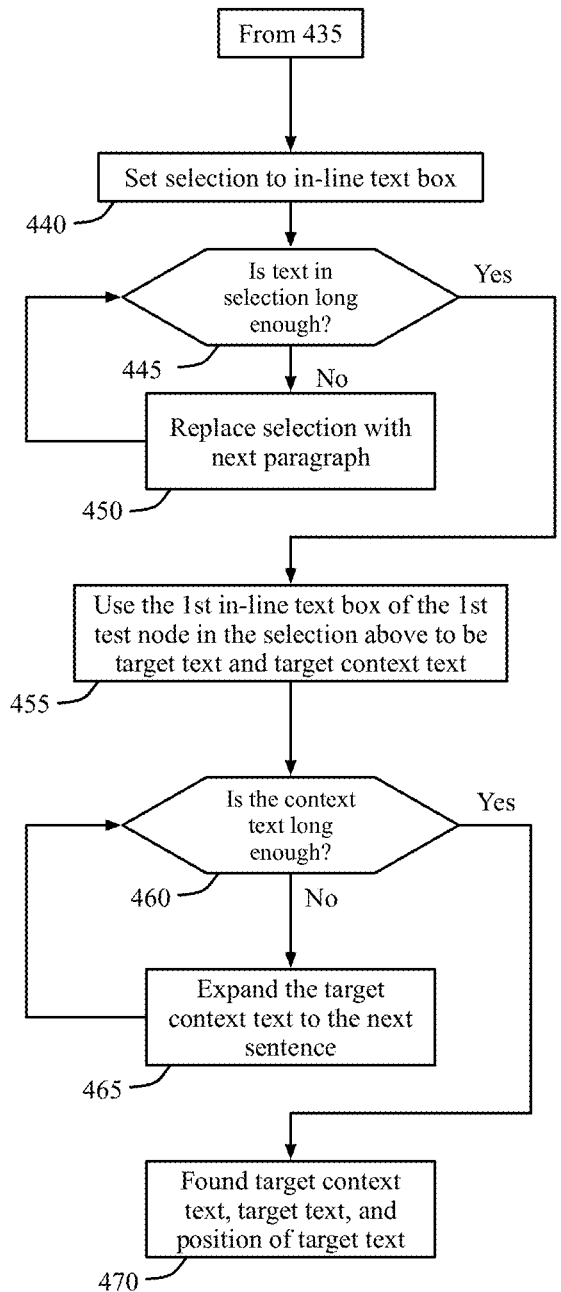

Initially, sending device browser application 215 collects the scroll position information that is used to restore the scroll position on receiving device browser application 255. In addition to the coordinates-based scroll position, sending device browser application 215 also determines the context text. In essence, sending device browser application 215 searches for and identifies some text with enough content on the top-left corner of the current screen view of sending user device 210. The details are illustrated in FIGS. 4A and 4B below. When the screen view is composed mostly of images, the source URL of the top-left image may be used.

Compose Scroll Position Information

Sending device browser application 215 determines the complete scroll position information, which may be composed of several fields that are shown in TABLE 1. In an exemplary embodiment, the data fields may be put together in a JSON format along with other browser state information and may be sent to receiving device browser application 255.

TABLE 1

| | |
|---|---|
| isImage | Indicates if the scrollToText is from image source URL. |

TABLE 1-continued

| | |
|---|---|
| scrollToText | The text of the 1st InlineTextBox in the context text sentences, if isImage is false or the text of the image source URL if isImage is true. |
| scrollToContextText | The text of the context text sentences. |
| scrollToTextPositionInView | The position of the scrollToText relative to the view. |
| scrollViewPosition | The viewport scroll position relative to the document content. |

Restore Scroll Position

After the enhanced browser state information is transferred to receiving user device 250, receiving device browser application 255 uses the transferred browser state information in the text message to restore the scroll position. The scroll position is restored after the URL is successfully loaded. Receiving device browser application 255 performs a text search on the webpage or a text match with the image source URL (if the "isImage" field is "True"), and scrolls to the position where a match is found. The details are illustrated FIGS. 5 and 6 below.

Cookie Transfer

Sending device browser application 215 also transfers the cookies of the current URL in order to restore the session state of the webpage using receiving device browser application 255. In an exemplary embodiment, a cookie having the properties in TABLE 2 may be transferred.

TABLE 2

| | |
|---|---|
| Name | Name of the cookie |
| Value | Value of the cookie |
| domain | Specifies the domain of the site |
| path | Specifies the directory path the cookie belongs to |
| expiryDate | Specifies the expiration time of the cookie in GMT format |
| isSecure | Indicates whether to transmit the cookie over https |
| isHttpOnly | Specifies whether a cookie is accessible by client-side script. |

Form Data Transfer

Sending device browser application 215 collects Form Data using conventional Web APIs. Receiving device browser application 255 restores the form with filled-in data on the remote device.

Figure 3:
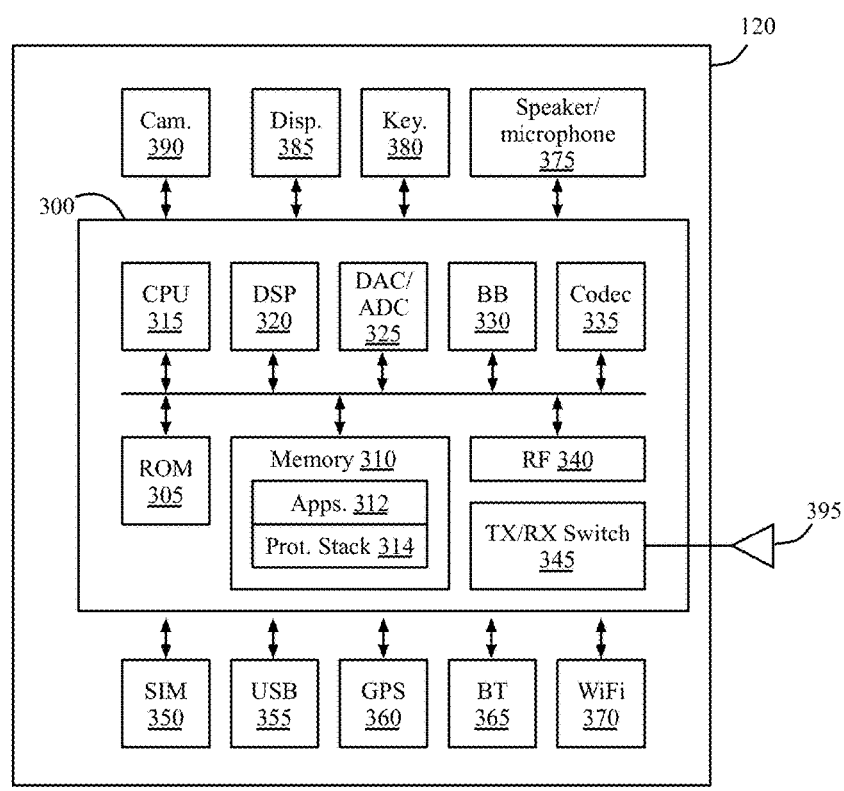
FIG. 3 illustrates in greater detail an exemplary browser-capable mobile phone that exchanges browser state information according to an embodiment of the disclosure.

FIG. 3 illustrates in greater detail exemplary browser-capable mobile phone 120 that exchanges browser state information according to an embodiment of the disclosure. Mobile phone 120 is also representative of tablet 130, smart TV 140, and laptop computer 150. Mobile phone 120 may operate as either sending user device 210 or receiving user device 250 by exchanging enhanced browser state information according to the principles of the disclosure.

Mobile phone 120 comprises core circuitry 300, which includes read-only memory (ROM) 305, random access memory (RAM) 310, central processing unit (CPU) 315, digital signal processor (DSP) 320, digital-to-analog converter (DAC)/analog-to-digital converter (ADC) circuitry 325, baseband (BB) circuitry block 330, codec circuitry block 335, radio frequency (RF) circuitry block 340, transmit (TX)/receive (RX) switch 345, and antenna 395.

In one embodiment, ROM 305 may store a boot-routine and other static data and RAM 310 may store an operating system (not shown), applications 312, and protocol stack 314. In an advantageous embodiment, ROM 305 and RAM 310 may comprise a single electronically erasable memory, such as a Flash memory, that is used in conjunction with a conventional RAM memory that is used to store dynamic data. Applications 312 in memory may include a social presence application (i.e., RCS Presence) that interacts with carrier SP server 150, an IP multimedia subsystem (IMS) framework that delivers IP multimedia services, a Calendar application that communicates with calendar server 160, and specific Social Network Site (SNS) applications (e.g., Facebook, Twitter), and the like that enable mobile phone 120 to exchange SP information with mobile phones used by other subscribers.

Importantly, applications 312 in memory may include a browser application that is executed under control of CPU 315 in order to exchange and process the enhanced state information according to the principles of the present disclosure. Thus, CPU 315 performs the functions described herein for both sending device browser application 215 in sending user device 210 and receiving device browser application 255 in receiving user device 250.

Mobile phone 120 further comprises SIM card interface 350, USB interface 355, GPS receiver 360, Bluetooth (BT) transceiver 365, WiFi (or WLAN) transceiver 370, speaker and microphone circuitry block 375, keyboard 380, display 385, and camera 390. In some embodiment, keyboard 380 and display 385 may be implemented together as a touch screen display.

CPU 315 is responsible for the overall operation of mobile phone 120. In an exemplary embodiment, CPU 315 executes applications 312 and protocol stack 314. CPU 315 runs the application layer and a wide variety of applications may be run in a smart phone implementation. Applications 312 may include audio, video, browser, and image/graphics applications. CPU 315 may run applications 312 that support various audio formats such as MP3, MP4, WAV, and rm. CPU 315 may run image applications 312 that support JPEG image formats and video applications 312 that support video formats (e.g., MPEG-1 to MPEG-5). CPU 315 may support various operating systems (not shown), such as Symbian, java, android, RT-Linux, Palm, and the like. For time critical applications, CPU 315 runs a real-time operating system (RTOS). In addition to the physical layer, there are other layers, including protocol stack 314, that enable mobile phone 120 to work with a network base station. In an exemplary embodiment, protocol stack 314 is ported on CPU 315.

DAC/ADC circuitry block 325 converts analog speech signals to digital signals, and vice versa, in mobile phone 120. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 330 may be implemented as part of DSP 320, which executes many of the baseband processing functions (i.e., physical layer, Layer 1, or L1 functions). BB circuitry block 300 may be ported on DSP 320 to meet the latency and power requirements of mobile phone 120. BB circuitry block 330 converts voice and data to be carried over the air interface to I/Q baseband signals.

BB circuitry block 330 may change from modem to modem for various air interface standards, such as GSM, CDMA, Wimax, LTE, HSPA, and others. BB circuitry block 330 is often referred to as the physical layer, or Layer 1, or L1. For mobile phones that work on GSM networks, the baseband part (Layer 1) running on DSP 320 and the protocol stack 314 running on CPU 315 are based on the GSM standard. For CDMA mobile phones, the Layer 1 and protocol stack 314 are based on the CDMA standard, and so on, for the LTE and HSPA standards-based mobile phones.

For speech or audio inputs, codec circuitry block 335 may compress and decompress the signal to match the data rate to the frame in which the data is sent. By way of example, codec circuitry block 335 may convert speech at an 8 KHz sampling rate to a 13 kbps rate for a full rate speech traffic channel. To do this, a residually excited linear predictive coder (RELP) speech coder may be which compresses 260 bits into a 20 millisecond duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a Viterbi decoder (used in receive path). Interleaving may be done for the data, which helps in spreading the error over time, thereby helping the receiver de-interleave and decode the frame correctly.

RF circuitry block 340 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 395 is a metallic object that converts and electro-magnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of mobile phone 120, antenna 395 may support different wire-area standards, including GSM, CDMA, LTE, and WiMAX, as well as short-range standards, including WiFi (WLAN), Bluetooth, and so on.

If antenna 395 comprises only one antenna used for both transmit and receive operations at different times, the TX/RX switch 345 couples both the transmit (TX) path and the receive (RX) path to antenna 395 at different times. TX/RX switch 345 is controlled automatically by DSP 320 based on a GSM frame structure with respect to the physical slot allocated for that particular GSM mobile phone in both the downlink and the uplink. For frequency division duplexing (FDD) systems, TX/RX switch 345 may be implement as a diplexer that acts as filter to separate various frequency bands.

Mobile phone 120 provides connectivity with laptops or other devices using WiFi (or WLAN) transceiver 370, BT transceiver 365, and universal serial bus (USB) interface 355. Mobile phone 120 also uses GPS receiver 360 in applications 312 that require position information. If mobile phone 120 is a conventional smart phone, applications 312 may include many popular applications, such as Facebook, Twitter, a browser, and numerous games that come pre-installed with mobile phone 120.

Speaker and microphone circuitry block 375 comprises microphone circuitry (or mic) that converts acoustic energy (i.e., air pressure changes caused by speech or other sounds) to electrical signals for subsequent processing. Speaker and microphone 375 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

Mobile phone 120 preferably includes camera 390. Presently, almost all mobile phones feature a camera module. Camera 390 may comprise a 12 megapixel, 14 megapixel, or a 41 megapixel camera.

Display 385 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 380 may comprise a simple matrix type keypad that contains numeric digits (0 to 9), alphabetic characters (A to Z), special characters, and specific function keys. In a more advanced embodiment for a smart phone implementation, keypad 380 may be implemented in the mobile phone software, so that keyboard 380 appears on display 385 and is operated by the user using the touch of a finger tip.

In FIGS. 4A and 4B, FIG. 5 and FIG. 6, the methods described find the context text from the web page 700 on the transferring device, get HitTestResults 710 based on the current viewport rectangle of the transferring device, and scan through the text nodes of HitTestResult 710, while ignoring fixed-position text nodes. For each text node, the method scans through the InlineTextBoxes of each text mode and determines the one closest to the top-left corner of the viewing rectangle 705 among all the HitTestResults 710 as shown in FIG. 7. The distance function is 10*Y+X gives nodes close to top-right some advantage. Based on the target text node found above, the method determines the first long-enough paragraph as a candidate paragraph. Starting from the first InlineTextBox in a candidate paragraph, the method finds the sentences with long-enough text and uses these sentences as final context text.

If a webpage has mostly images, then the methods described get HitTestResults 710 based on the current viewport rectangle, scan through the image elements of Hit-TestResult 710, while ignoring fixed-position images. The methods determine the image element closest to the top-left corner 715 of the viewing rectangle 705. Again, the distance function is 10*Y+X, giving nodes close to top-right some advantage. The method uses the imageSourceURL as the final context text.

In FIGS. 4A and 4B, FIG. 5 and FIG. 6, the described methods use a combination of text search and coordinates adjustments when restoring scroll position on the receiving device. There is no need to do a text search if the original scroll position is 0. Otherwise, the methods perform a text search on the web content or source URLs of images based on the original text source. A text match may be based on exact match or a degree of similarity match. The methods also perform an additional adjustment based on the position of the original text relative to the view.

FIGS. 4A and 4B are a flow diagram illustrating gathering and transmitting of browser state information by sending device browser application 215 in sending user device 210 according to an embodiment of the disclosure. Initially, sending device browser application 215 identifies nodes in the current viewport rectangle of the browser screen. The nodes are stored in the record HitTestResults based on current viewport rectangle (step 405).

For each node in HitTestResults (step 410), sending device browser application 215 determines if the node is a text node (step 415). If the node is not a text node (No in 415), then sending device browser application 215 examines the next node in HitTestResults (step 410). If the node is a text node (Yes in 415), then sending device browser application 215 determines if the text node has a fixed position (step 420). If the text node does have a fixed position (Yes in 420), then sending device browser application 215 examines the next node (step 410). If the text node does not have a fixed position (No in 420), then sending device browser application 215 determines, for each in-line text box in the node, which in-line text box is closest to the top-left of the viewport rectangle (step 425).

Sending device browser application 215 then determines if the last node or in-line text box has been reached (step 430). If not, (No in 430), sending device browser application 215 examines the next node in HitTestResults (step 410). If the last node/in-line text box has been reached, sending device browser application 215 ends the search loop in FIG. 4A (step 435) and moves to item 440 in FIG. 4B.

Next, sending device browser application 215 sets the selection to the in-line text box (step 440). Sending device browser application 215 then determines if the text in the selection is long enough (step 445). If the text is not long enough (No in 445), sending device browser application 215 replaces the selection with the next paragraph (step 450) and returns to step 445. If the text is long enough (Yes in 445), sending device browser application 215 uses the first in-line text box of the first test node in the selection above to be the target text and the target context text (step 455).

Sending device browser application 215 then determines if the context text is long enough (step 460). If the context text is not long enough (No in 445), sending device browser application 215 expands the target contest text to the next sentence (step 465) and returns to step 455. If the context text is long enough (Yes in 445), sending device browser application 215 determines that it has found the target context text, the target text, and the position of the target text (step 470). This is part of the enhance browser state information that is transferred to receiving device browser application 255.

Figure 5:
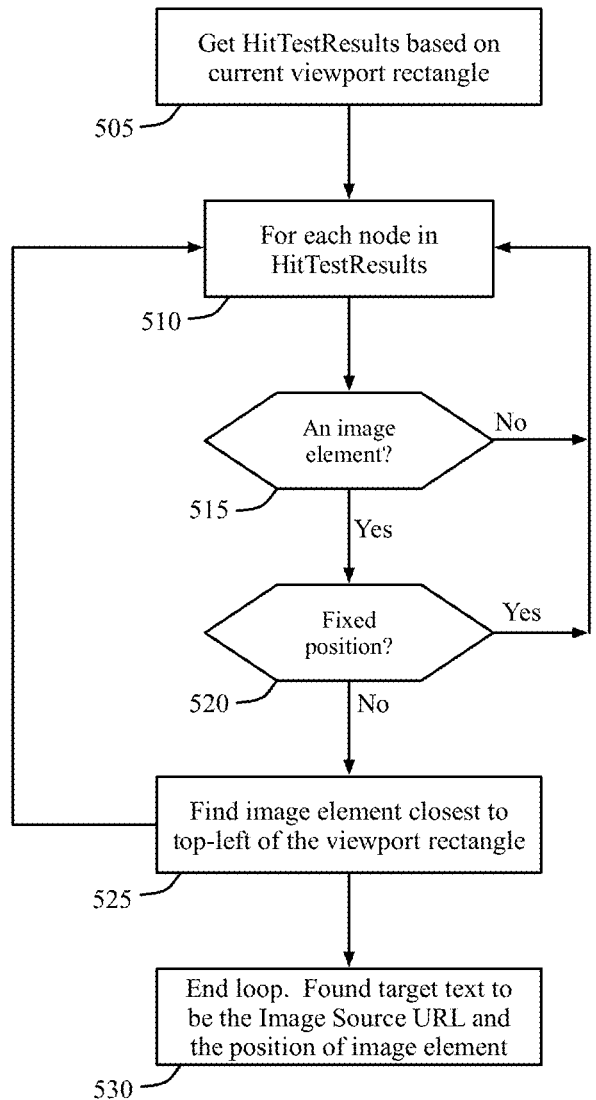
FIG. 5 is a flow diagram illustrating gathering and transmitting of browser state information in a user device according to another embodiment of the disclosure.

FIG. 5 is a flow diagram illustrating gathering and transmitting of browser state information by sending device browser application 215 in sending user device 210 according to another embodiment of the disclosure. Initially, sending device browser application 215 identifies nodes in the current viewport rectangle of the browser screen. The nodes are stored in the record HitTestResults based on current viewport rectangle (step 505).

For each node in HitTestResults (step 510), sending device browser application 215 determines if the node is an image element (step 515). If the node is not an image element (No in 515), then sending device browser application 215 examines the next node in HitTestResults (step 510). If the node is an image element (Yes in 515), then sending device browser application 215 determines if the image element has a fixed position (step 520). If the image element does have a fixed position (Yes in 520), then sending device browser application 215 examines the next node (step 510). If the image element does not have a fixed position (No in 520), then sending device browser application 215 determines which image element is closest to the top-left of the viewport rectangle (step 525). Sending device browser application 215 ends the search loop (step 530) and determines that is has found the target text to be the image source URL and the position of the image element.

Figure 6:
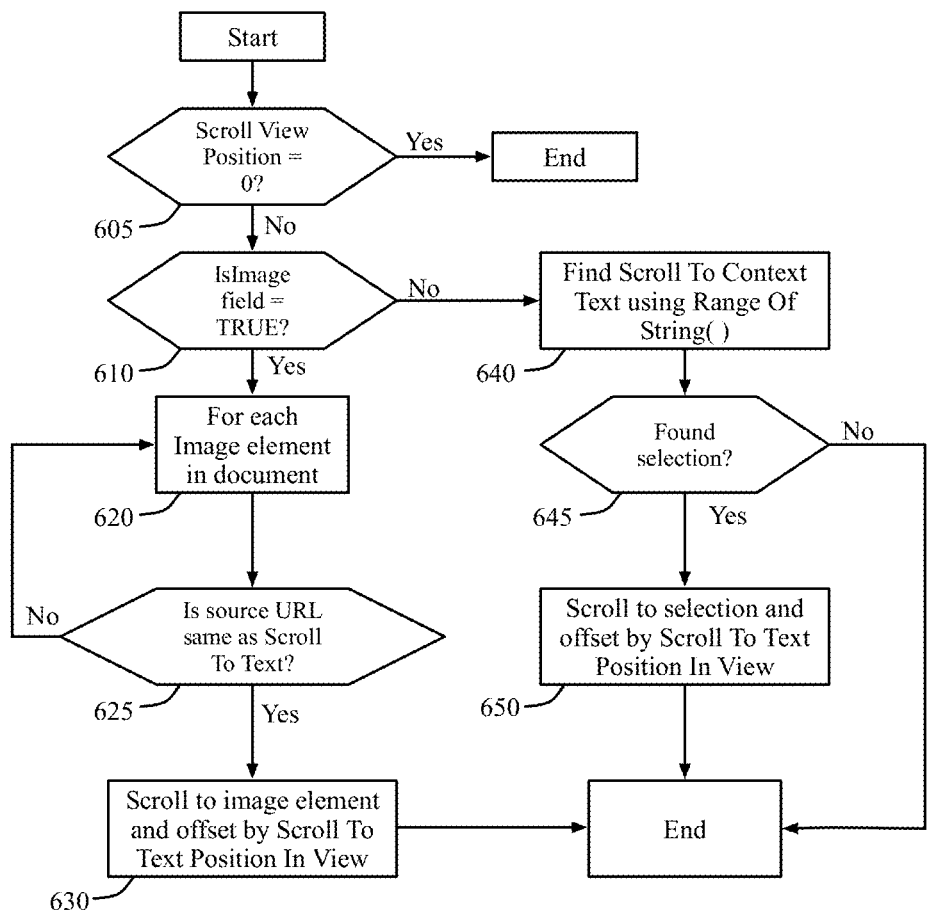
FIG. 6 is a flow diagram illustrating receiving and processing browser state information in a user device according to one embodiment of the disclosure.
Figure 7:
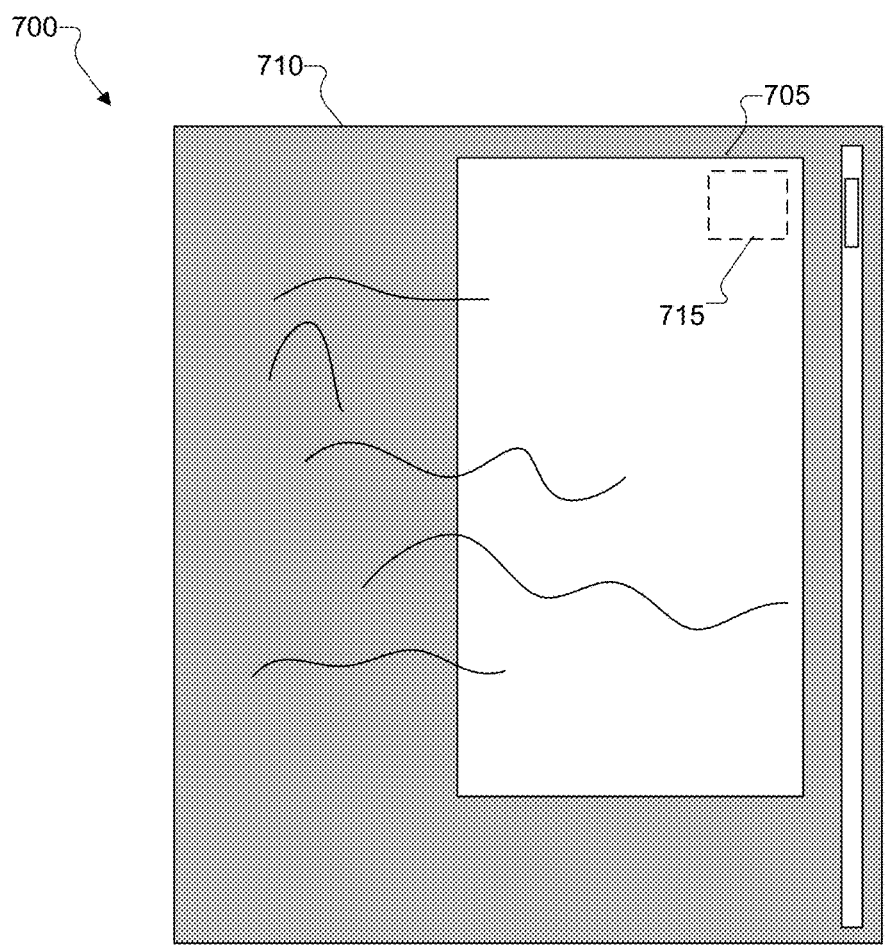
FIG. 7 illustrates a web page displayed on a user device according to one embodiment of the disclosure.

FIG. 6 is a flow diagram illustrating receiving and processing browser state information in a user device according to one embodiment of the disclosure. Initially, receiving device browser application 255 determines if the data field scrollViewPosition from TABLE 1 is equal to 0 (step 605). If not (No in 605), then receiving device browser application 255 determines if data field IsImage from TABLE 1 is TRUE (step 610).

If the IsImage data field is TRUE (Yes in 610), then for each image element in the document (step 560), receiving device browser application 255 determines if the source URL is the same as the data field scrollToText from TABLE 1 (step 625). If not (No in 625), receiving device browser application 255 returns to step 620. If the source URL is the same as the data field scrollToText (Yes in 625), then receiving device browser application 255 scrolls to the image element and offsets by the value in data field scrollToTextPositionInView from TABLE 1 (step 630).

If the IsImage data field is not TRUE (No in 610), then receiving device browser application 255 determines the value in data field scrollToContextText in TABLE 1 using the value in the rangeOfString( ) data field (step 640). If a next selection is not found (No in 645), receiving device browser application 255 ends the process. If a next selection is found (Yes in 645), receiving device browser application 255 scrolls to the selection and offsets by the value in the data field scrollToTextPositionInView (step 650).

It will be appreciated that various embodiments of the present disclosure as described in the specification may be realized in the form of hardware, software or a combination of hardware and software. The software may be stored in a non-transitory computer readable storage medium configured to store one or more application programs (software modules). The application programs comprise computer-executable instructions that cause a processor in an electronic device to perform a method of the present disclosure. Accordingly, exemplary embodiments provide a program comprising code for implementing an apparatus or a method as described and claimed herein and a non-transitory machine-readable storage storing such a program. Alternatively, the functionality herein may be implemented by as an Integrated Circuit (ID) or any combination of one or more processors and ICs.

The computer-executable instructions may be stored in the form of volatile or non-volatile storage such as, for example, a storage device like a read-only memory (ROM), random access memory (RAM), memory chips, device or integrated circuits or on an optically or magnetically readable medium such as, for example, a compact disk (CD), digital versatile disk (DVD), magnetic disk, magnetic tape, or the like. It will be appreciated that the storage devices and storage media are various embodiments of non-transitory machine-readable storage that are suitable for storing a program or programs comprising instructions that, when executed, implement various embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A first user device comprising:
   a first display;
   a memory configured to store a browser application; and
   a processor configured to:
      execute the browser application and display on the first display a current viewing rectangle of a current webpage;
      identify node information of the current viewing rectangle of a current webpage, wherein node information comprises whether each node is a text element or an image element, and whether each node has a fixed position;

determine, based on node information, context text closest to a top-left corner of the current viewing rectangle;

identify browser state information associated with the context text and a scroll position of the current viewing rectangle in the current webpage on the first display;

compose the browser state information into an enhanced browser state message; and transfer the enhanced browser state message over an internet protocol (IP) network to a second user device comprising a second display, wherein the enhanced browser state message further comprises a URL of the current webpage and scroll position information associated with the scroll position of the current viewing rectangle in the current webpage on the first display, wherein the scroll position information comprises a scroll position of context text closest to a top-left corner of the current viewing rectangle, wherein the enhanced browser state message triggers display, on the second display, the current webpage scrolled to the scroll position of the current viewing rectangle of the first display at the context text closest to the top-left corner of the current viewing rectangle, and wherein the first display of the first user device and the second display of the second user device are different size display screens.

2. The first user device as set forth in claim 1, wherein the enhanced browser state message further comprises cookie data associated with the current webpage.

3. The first user device as set forth in claim 1, wherein the enhanced browser state message further comprises form data associated with the current webpage.

4. The first user device as set forth in claim 1, wherein the context text is associated within an in-line text box.

5. The first user device as set forth in claim 1, wherein the scroll position information comprises a scroll position of the image element closest to the top-left corner of the current viewing rectangle.

6. The first user device as set forth in claim 5, wherein the scroll position information comprises a source URL associated with the image element closest to the top-left corner of the current viewing rectangle.

7. The first user device as set forth in claim 1, wherein the processor transfers the enhanced browser state message over the IP network to the second user device as a text message.

8. A method comprising:

storing a browser application;

executing the browser application;

displaying on a first display of a first user device a current viewing rectangle of a current webpage;

identifying node information of the current viewing rectangle of a current webpage, wherein node information comprises whether each node is a text element or an image element, and whether each node has a fixed position;

determining, based on node information, context text closest to a top-left corner of the current viewing rectangle;

identifying browser state information associated with the context text and a scroll position of the current viewing rectangle in the current webpage on the first display;

composing the browser state information into an enhanced browser state message; and transferring, by the first user device, the enhanced browser state message over an internet protocol (IP) network to a second user device comprising a second display, wherein the enhanced browser state message further comprises a URL of the current webpage and scroll position information associated with the scroll position of the current viewing rectangle in the current webpage on the first display, wherein the scroll position information comprises a scroll position of context text closest to a top-left corner of the current viewing rectangle, wherein the enhanced browser state message triggers display, on the second display, the current webpage scrolled to a position of the current viewing rectangle of the first display at the context text closest to the top-left corner of the current viewing rectangle, and wherein the first display of the first user device and the second display of the second user device are different size display screens.

9. The method as set forth in claim 8, wherein the enhanced browser state message further comprises cookie data associated with the current webpage.

10. The method as set forth in claim 8, wherein the enhanced browser state message further comprises form data associated with the current webpage.

11. The method as set forth in claim 8, wherein the context text is associated within an in-line text box.

12. The method as set forth in claim 8, wherein the scroll position information comprises a scroll position of the image element closest to the top-left corner of the current viewing rectangle.

13. The method as set forth in claim 12, wherein the scroll position information comprises a source URL associated with the image element closest to the top-left corner of the current viewing rectangle.

14. The method as set forth in claim 8, transferring the enhanced browser state message comprises transferring the enhanced browser state message over the IP network to the second user device as a text message.

15. A non-transitory computer readable medium including a plurality of instructions that, when executed by a processor, are configured to cause the processor to perform a method of transferring browser state information from a sending user device to a receiving user device, the method comprising:

identifying node information of a current viewing rectangle of a current webpage, wherein node information comprises whether each node is a text element or an image element, and whether each node has a fixed position;

determining, based on node information, context text closest to a top-left corner of the current viewing rectangle;

identifying browser state information in the sending user device associated with the context text and a scroll position of a current viewing rectangle in the current webpage displayed on a first display of the sending user device;

composing the browser state information into an enhanced browser state message; and transferring the enhanced browser state message over an internet protocol (IP) network from the sending user device to the receiving user device comprising a second display, wherein the enhanced browser state message further comprises a URL of the current webpage and scroll position information associated with the scroll position of the current viewing rectangle in the current webpage on the first display, wherein the scroll position information comprises a scroll position of context text closest to a top-left corner of the current viewing rectangle, wherein the enhanced browser state message triggers display, on the second display of the receiving user device, the current webpage scrolled to the scroll position of the current viewing rectangle of the first display at the context text closest to the top-left corner of the current viewing rectangle, and wherein the first display of the sending user device and the second display of the receiving user device are different size display screens.

16. The non-transitory computer readable medium as set forth in claim 15, wherein the enhanced browser state message further comprises cookie data associated with the current webpage.

17. The non-transitory computer readable medium as set forth in claim 15, wherein the enhanced browser state message further comprises form data.

18. The non-transitory computer readable medium as set forth in claim 15, wherein the context text is associated with an in-line text box.

19. The non-transitory computer readable medium as set forth in claim 15, wherein the scroll position information comprises a scroll position of an image element closest to the top-left corner of the current viewing rectangle.

20. The non-transitory computer readable medium as set forth in claim 19, wherein the scroll position information comprises a source URL associated with the image element closest to the top-left corner of the current viewing rectangle and wherein transferring the enhanced browser state message comprises transferring the enhanced browser state message over the IP network to the receiving user device as a text message.

* * * * *